US005833452A

United States Patent [19]

[11] Patent Number: 5,833,452

Donelson et al.

[45] Date of Patent: Nov. 10, 1998

[54] COATED METAL SINTERING CARRIERS FOR FUEL CELL ELECTRODES

[75] Inventors: Richard Donelson, Glen Waverly, Australia; E. S. Bryson, Downers Grove, Ill.

[73] Assignee: M-C Power Corporation, Burr Ridge, Ill.

[21] Appl. No.: 657,948

[22] Filed: Jun. 4, 1996

Related U.S. Application Data

[63] Continuation-in-part of Ser. No. 356,910, Dec. 15, 1994, abandoned.

[51] Int. Cl.[6] .............................. F27B 9/00; F27B 21/02; F27D 3/00; B32B 15/04

[52] U.S. Cl. .............................. 432/58; 432/14; 432/121; 428/457

[58] Field of Search .................................... 428/457, 458, 428/459, 460, 461, 462, 463, 464, 465, 468; 252/29, 30, 502; 419/1; 432/13, 120, 121, 143, 153, 162, 14, 58; 266/176, 177

[56] References Cited

U.S. PATENT DOCUMENTS

| | | | |
|---|---|---|---|
| 3,632,095 | 1/1972 | Rode et al. | 263/47 |
| 3,679,481 | 7/1972 | Pinard | 136/24 |
| 3,704,872 | 12/1972 | Klein | 263/3 |
| 3,861,938 | 1/1975 | Jackson | 117/31 |
| 3,881,048 | 4/1975 | Bertrand | 428/447 |
| 3,904,555 | 9/1975 | Matsuda et al. | 252/503 |
| 4,140,834 | 2/1979 | Marcantonio et al. | 428/419 |
| 4,177,943 | 12/1979 | Suzuki et al. | 222/591 |
| 4,189,129 | 2/1980 | Engelhard | 266/251 |
| 4,202,007 | 5/1980 | Dougherty et al. | 357/80 |
| 4,259,061 | 3/1981 | Dubetsky | 432/13 |
| 4,409,111 | 10/1983 | Holmes et al. | 252/30 |
| 4,460,666 | 7/1984 | Dinkler et al. | 429/236 |
| 4,670,214 | 6/1987 | Magnuson et al. | 419/3 |
| 4,780,437 | 10/1988 | Smith | 502/101 |
| 4,994,221 | 2/1991 | Tanaka et al. | 264/81 |
| 4,997,698 | 3/1991 | Oboodi et al. | 428/209 |
| 5,079,674 | 1/1992 | Malaspina | 361/502 |
| 5,108,629 | 4/1992 | Matsuda et al. | 252/11 |
| 5,110,541 | 5/1992 | Yamamasu et al. | 419/2 |
| 5,442,005 | 8/1995 | Brugarolas et al. | 524/276 |
| 5,482,742 | 1/1996 | Takamiya et al. | 427/156 |
| 5,516,546 | 5/1996 | Hari et al. | 427/122 |
| 5,527,641 | 6/1996 | Koshiishi et al. | 429/163 |
| 5,612,130 | 3/1997 | Smirnov et al. | 428/323 |

*Primary Examiner*—John J. Zimmerman
*Assistant Examiner*—Michael LaVilla
*Attorney, Agent, or Firm*—Speckman Pauley Petersen & Fejer

[57] ABSTRACT

A carrier for conveying components of a fuel cell to be sintered through a sintering furnace. The carrier comprises a metal sheet coated with a water-based carbon paint, the water-based carbon paint comprising water, powdered graphite, an organic binder, a wetting agent, a dispersing agent and a defoaming agent.

4 Claims, No Drawings

COATED METAL SINTERING CARRIERS FOR FUEL CELL ELECTRODES

CROSS-REFERENCE TO RELATED APPLICATION

This application is a continuation-in-part of a U.S. patent application Ser. No. 08/356,910 and a filing date of 15 Dec. 1994, now abandoned.

The U.S. Government has a paid-up license in this invention and the right in limited circumstances to require the patent owner to license others on reasonable terms as provided for by the terms of Contract No. DE-AC21-90MC27394 awarded by the U.S. Department of Energy.

BACKGROUND OF THE INVENTION

1. Field of the Invention

This invention relates to a process and apparatus for sintering of electrodes for fuel cells, in particular, electrodes for molten carbonate fuel cells. More particularly, this invention relates to a coated metal sintering carrier for sintering molten carbonate fuel cell electrodes having a water-based carbon paint coating that allows sintering of the electrodes without impeding the shrinkage or compromising the flatness of the electrodes. Use of a water-based carbon paint as a coating eliminates the safety hazards associated with the use of solvent-based carbon paints which are also used in electrode sintering applications.

2. Description of Prior Art

The present invention relates to a method and apparatus for preparing porous electrodes for use in a variety of applications. One principal use is for the preparation of porous electrodes to be employed in molten carbonate fuel cells.

Molten carbonate fuel cells typically operate at high temperatures of about 600°–750° C. to convert chemical energy to D.C. electricity. Fuels such as hydrogen, carbon monoxide or methanol react with oxidant gases such as air or oxygen to produce the electrical energy.

Typically, these fuel cells operate in stacks of individual fuel cell units. Each fuel cell unit contains an anode, a cathode and an electrolyte structure separating the two electrodes. The electrode structure is prepared by mixing the component powders thereof with a suitable organic binder and forming the "green" composition into a flattened structure such as a sheet or a tape formed by a tape-casting method. The flattened structure is subsequently sintered at sufficient conditions to bind the particles together into a porous structure. To effect sintering of the "green" electrodes, the electrodes are loaded onto a conveyor means which carries the "green" electrodes into the sintering furnace.

Known sintering methods for making electrodes consist of using either carbon blocks or carbon paper as a support for the "green" electrode as it is conveyed through the sintering furnace. However, carbon blocks have the disadvantage that they are either very fragile or very thick and heavy. In the latter case, they, of course, also have a high thermal mass, thereby affecting the amount of time and energy required for sintering. The use of carbon paper is also problematic due to bubbling and reaction with the electrode and, possibly, with the electrode binder, causing flaws in the sintered electrode. The requirements for a suitable sintering carrier for electrodes to be sintered are that it not impede the shrinkage of the electrode as it is heated, that it not compromise the flatness of the resulting electrode structure and that it not add impurities to the resulting electrode structure.

U.S. Pat. No. 5,110,541 teaches a method for manufacturing a porous electrode for molten carbonate fuel cells in which a mixture of nickel powders and a pulverized aluminum-based intermetallic compound is formed into a slurry, shaped into a sheet or tape and sintered to form the porous electrode. The aluminum-based intermetallic compound, in accordance with the teachings of this patent, provides reinforcement for the porous electrode.

U.S. Pat. No. 4,994,221 teaches a method for producing a carbon electrode in which a carbon material is directly deposited on an electroconductive electrode substrate by chemical vapor deposition and the substrate, coated with the carbon material, is subjected to an electrochemical treatment so that the carbon material is doped with a charge carrier material capable of being reversely intercalated therein and deintercalated therefrom. The electrochemically treated substrate is compressed, forming a thin plate-shaped carbon electrode having a high density.

U.S. Pat. No. 4,460,666 teaches an electrode for an electrolytic cell consisting of an embossed electrically conductive substrate coated with a sintered porous metal powder on at least one major surface thereof. The substrate material is preferably a metallic material such as nickel, stainless steel or nickel-plated steel. The substrate is coated by passing through a container filled with a slurry of metal powder, dried to evaporate water contained in the slurry, and then sintered.

U.S. Pat. No. 5,079,674 teaches an electrode for use in supercapacitors made by adding to an aqueous solution of metal salts porous carbon particles to form a slurry, the metal salts adsorbing onto the porous carbon particles. The metal salts are converted to equivalent metal hydroxides or complex oxides, and the resulting solution is decanted. An emulsion of fluorocarbon polymer is added to the decanted solution and kneaded until the fluorocarbon polymer is fibrillated. The kneaded admixture is formed into a sheet and dried in an oven, the dried sheet then being laminated to one or both sides of a separator.

U.S. Pat. No. 4,202,007 teaches miniaturized integrated circuit devices formed by mixing finely divided particles of a substrate and other chemical additives and casting the resulting mixture into slips to form pliant green sheets. An embryonic conductor pattern is coated on the green sheet which is then sintered.

U.S. Pat. No. 3,679,481 teaches a process for manufacturing sintered carrier-type negative electrodes for alkaline storage batteries.

SUMMARY OF THE INVENTION

It is an object of this invention to provide a process and apparatus for sintering electrodes for use in fuel cells which produces exceptionally flat electrodes.

It is another object of this invention to provide a process and apparatus for sintering electrodes for use in fuel cells which does not impede the shrinkage of the electrodes during sintering.

It is yet another object of this invention to provide a process and apparatus for sintering of electrodes for fuel cells which eliminates sticking of the electrodes to the support upon which the electrode is placed for sintering.

It is yet another object of this invention to provide an apparatus for sintering of electrodes for fuel cells which avoids diffusion of unwanted elements from the electrode supports into the electrodes.

It is yet another object of this invention to provide an apparatus for sintering of electrodes for fuel cells which eliminates the hazards associated with the use of solvent-based materials as an electrode support for electrodes being sintered.

These and other objects of this invention are achieved by a carrier for conveying components of a fuel cell to be sintered, in particular electrodes thereof, comprising a metal sheet coated with a water-based carbon paint, said water-based carbon paint comprising water, powdered graphite, an organic binder, at least one wetting agent, at least one dispersing agent, and at least one defoaming agent. Such coated metal sintering carrier makes the sintering of electrodes for a fuel cell having an active area greater than about 1 square meter possible in a reducing atmosphere, continuous belt furnace, without impeding the shrinkage or compromising the flatness of the subject electrodes. Due to the nature of the coating, sticking of the electrode to the carrier is prevented and flatness of the electrode is maintained. In addition, the sintering carrier in accordance with this invention provides even sintering of the electrodes. It is also designed to be low in weight, thus reducing the physical load on the conveyor belt on which the "green" electrode is conveyed through the sintering furnace.

A process for sintering electrodes for use in electrochemical cells in accordance with one embodiment of this invention comprises placing a "green" electrode in the form of a flat structure on an electrode sintering carrier, which carrier comprises a metal sheet coated with a water-based carbon paint. The electrode sintering carrier carrying the "green" coated electrode is conveyed into a sintering furnace in which the electrode is heated to a sintering temperature. The electrode sintering carrier with the sintered electrode is then removed from the sintering furnace.

DESCRIPTION OF PREFERRED EMBODIMENTS

As previously stated, the critical attributes of a carrier for conveying components of a fuel cell to be sintered are its ability to produce flat electrodes without impeding the shrinkage of the electrodes during the sintering process and the ability to avoid diffusion of unwanted elements into the electrodes during the sintering process. In addition, it is important that the carrier be able to accommodate electrodes having an active area greater than about 1 square meter.

Accordingly, a carrier for conveying components of a fuel cell to be sintered in accordance with one embodiment of this invention comprises a metal sheet coated with a water-based carbon paint, which water-based carbon paint comprises water, powdered graphite, an organic binder, a wetting agent, a dispersing agent, and a defoaming agent. The material comprising the metal sheet is determined by the temperature of the sintering process, the durability of the material, and the ability to prevent diffusion of unwanted elements from the carrier into the electrodes. Preferably, the metal sheet is constructed of a material selected from the group consisting of nickel-based alloys and 300 series stainless steel, that is Austinetic stainless steels having up to about 2% by weight manganese. By nickel-based alloys, we mean INCONEL 600 comprising by weight about 76% nickel, about 15% chromium, and about 8% iron, nickel 200 (commercially pure nickel), and MONEL.

For purposes of coating the surface of the metal sheet, the viscosity of the water-based carbon paint is preferably between about 100 and about 200 centipoise, depending upon temperature, in order to allow freshly applied paint to self-level when the paint is applied to the metal sheet carrier, as well as through the drying process, and to maintain a sufficient quantity of graphite powder on the metal sheet carrier after the paint has thoroughly dried, to prevent fusing of the electrodes to the carrier during sintering. Viscosities substantially outside of this range result in high surface roughness and fusing of the electrodes to the carrier due to insufficient deposit of graphite on the carrier surface. The water-based carbon paint coating the metal sheet in accordance with a preferred embodiment of this invention comprises between about 0.5% to about 5.0% of an organic binder. The organic binder is utilized as needed to control the viscosity of the paint in order to compensate for environmental variances, such as temperature, which also affect viscosity. In addition, the amount of organic binder will vary depending on the grade of binder employed.

The organic binder is a dry, powdered, cellulosic material that mixes with water to form a binder solution which exhibits a viscosity which is both temperature and concentration dependent. In accordance with one preferred embodiment, the binder is provided in weight percentages as set forth hereinabove together with wetting, dispersing, and defoaming agents such that the paint exhibits self-leveling properties when it is applied to the metal carrier, uniform distribution of graphite powder particles, no air bubbles or foaming, and a minimum of emissions and outgassing during thermal decomposition of the binder and said wetting, dispersing and defoaming agents, which occurs during the initial stages of the sintering process, at temperatures in the range of about ambient to 700° C. A suitable organic binder for use with said water-based carbon paint, in accordance with one embodiment of this invention, is hydroxypropyl methylcellulose. Suitable defoaming and dispersing agents are alcohols and silicone glycol is a suitable wetting agent. Such water-based carbon paint, although not drying as fast as alcohol or solvent-based paints, eliminates the need for an explosion-proof painting area or fume hood. In order to prevent outgassing and minimize thermal decomposition of the binder and wetting, dispersing and defoaming agents during the initial stages of sintering, which can produce defects such as blow holes in the electrodes during the sintering process, it is desired that the amounts of said binder and agents be maintained at as low a level as possible while still retaining the required functionality. In accordance with one preferred embodiment of this invention, the water-based carbon paint comprises, by weight, about 79.5% water, about 15.9% powdered graphite, about 2.6% organic binder, about 0.8% wetting agent, about 0.8% dispersing agent, and about 0.4% defoaming agent.

In accordance with one preferred embodiment of this invention, the powdered graphite has a particle size such that at least about 90% of the graphite passes through a 325 mesh screen. Larger graphite particle sizes are not desirable due to the roughness of the resulting finish. As previously indicated, one of the functions of the water-based carbon paint of the carrier of this invention is to permit the electrodes to shrink unimpeded during sintering of the electrode. A high surface roughness, which would result from the use of larger graphite particle sizes, would impede shrinkage of the electrodes during sintering.

The powdered graphite, in addition to its impact on shrinkage of the electrodes during sintering, also inhibits fusing of the electrodes to the electrode carrier, particularly when the viscosity of the water-based carbon paint is relatively low.

A process for sintering electrodes for use in electrochemical cells in accordance with this invention comprises placing an electrode in the form of a flat structure on an electrode sintering carrier, which carrier comprises a metal sheet coated with a water-based carbon paint, conveying the carrier into a sintering furnace, heating the electrode to a sintering temperature, and removing the carrier with the sintered electrode from the sintering furnace.

In a preferred embodiment of the process of this invention, sintering is carried out in a reducing atmosphere.

In accordance with one embodiment of this invention, the water-based carbon paint has a viscosity preferably between about 100 and 200 centipoise.

In a particularly preferred embodiment of the process of this invention, the water-based carbon paint comprises between about 0.5% and about 5.0% of an organic binder.

The metal sheet, which may be in the form of a continuous belt, is constructed of a material selected from the group consisting of nickel-based alloys and 300 series stainless steel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In an apparatus for sintering of fuel cell components for an electrochemical cell, said apparatus having means for conveying said fuel cell components through said apparatus, the improvement comprising:

said means for conveying said fuel cell components through said apparatus comprising a fuel cell component carrier comprising a metal sheet coated with a water-based carbon paint, said water-based carbon paint comprising water, powdered graphite, between about 0.5% and about 5.0%, by weight, of an organic binder, at least one wetting agent, at least one dispersing agent and at least one defoaming agent.

2. An apparatus in accordance with claim 1, wherein said water-based carbon paint has a viscosity between about 100 and about 200 centipoise.

3. An apparatus in accordance with claim 1, wherein said metal sheet is constructed of a material selected from the group consisting of nickel-based alloys and 300 series stainless steel.

4. An apparatus in accordance with claim 1, wherein said organic binder is hydroxypropyl methylcellulose.

* * * * *